US009211491B2

(12) United States Patent
Le Port et al.

(10) Patent No.: US 9,211,491 B2
(45) Date of Patent: Dec. 15, 2015

(54) AIR FILTRATION MEDIA AND PROCESSES FOR MANUFACTURING THE SAME

(71) Applicant: LYDALL, INC., Manchester, CT (US)

(72) Inventors: Herve Le Port, Vannes (FR); Guillaume Moreau, Thonon les Bains (FR)

(73) Assignee: LYDALL, INC., Manchester, CT (US)

( * ) Notice: Subject to any disclaimer, the term of this patent is extended or adjusted under 35 U.S.C. 154(b) by 222 days.

(21) Appl. No.: 13/669,717

(22) Filed: Nov. 6, 2012

(65) Prior Publication Data

US 2014/0123613 A1   May 8, 2014

(51) Int. Cl.
*B01D 46/00* (2006.01)
*B01D 39/08* (2006.01)
*B01D 39/16* (2006.01)
*B01D 39/20* (2006.01)

(52) U.S. Cl.
CPC .............. *B01D 39/08* (2013.01); *B01D 39/163* (2013.01); *B01D 39/2024* (2013.01); *B01D 2239/025* (2013.01); *B01D 2239/0636* (2013.01); *B01D 2239/1233* (2013.01)

(58) Field of Classification Search
CPC .. B01D 39/08; B01D 39/163; B01D 2239/25; B01D 2239/636; B01D 39/2017; B01D 39/2055; B01D 39/2082
USPC ............. 55/524, 527–528, DIG. 12; 264/103; 210/491, 501, 505
See application file for complete search history.

(56) References Cited

U.S. PATENT DOCUMENTS

| 4,011,067 | A |   | 3/1977 | Carey, Jr. | |
|---|---|---|---|---|---|
| 5,607,491 | A | * | 3/1997 | Jackson et al. | 55/528 |
| 6,858,057 | B2 | * | 2/2005 | Healey | 55/528 |
| 2008/0160856 | A1 | * | 7/2008 | Chen et al. | 442/341 |
| 2009/0045133 | A1 |   | 2/2009 | Waterhouse et al. | |
| 2010/0212272 | A1 |   | 8/2010 | Sealey et al. | |
| 2012/0085695 | A1 | * | 4/2012 | Saxena et al. | 210/491 |

FOREIGN PATENT DOCUMENTS

WO   2009085679 A1   7/2009

OTHER PUBLICATIONS

Notification of Transmittal of the International Search Report and the Written Opinion of the International Searching Authority, or Declaration, issued in International Application No. PCT/US2013/067974, mailed Jul. 9, 2014; 14 pages.
Notification Concerning Transmittal of the International Preliminary Report on Patntability (Chapter I of the Patent Cooperation Treaty), issued in International Application No. PCT/US2013/067974, dated May 21, 2015; 10 pages.

* cited by examiner

*Primary Examiner* — Jason M Greene
*Assistant Examiner* — Karla Hawkins
(74) *Attorney, Agent, or Firm* — Cantor Colburn LLP

(57) ABSTRACT

Nonwoven filter media with an alpha value greater than about 13 generally includes a plurality of large diameter fibers, a plurality of ultrafine diameter fibers, and a binder. The large diameter fibers have an average diameter of greater than about 6 microns and make up more than about 60% by weight of the fiber web. The ultrafine diameter fibers have an average diameter of less than about 1 micron. Also disclosed is a method of manufacturing a filter media.

19 Claims, No Drawings

AIR FILTRATION MEDIA AND PROCESSES FOR MANUFACTURING THE SAME

BACKGROUND

The present disclosure generally relates to filter media which can be used in ASHRAE applications and, more particularly, to filter media including fiber webs with high efficiency, low pressure drops, and a low energy consumption.

Filter media can be used to remove contamination in a variety of applications. Depending on the application, filter media are be designed to have different performance characteristics. For applications in heating, ventilating, refrigerating, and air conditioning applications, the media can be designed to have performance characteristics approved by the American Society of Heating, Refrigeration and Air Conditioning Engineers (ASHRAE). Such media are referred to as ASHRAE filter media.

Filter media can be formed of a web of fibers. The fiber web provides a porous structure that permits fluid (e.g., gas, air) to flow through the filter media. Contaminant particles within the fluid are trapped on the fibrous web. Filter media characteristics, such as pressure drop, surface area, and basis weight, affect filter performance, including filter efficiency and resistance to fluid flow through the filter. In general, higher filter efficiencies result in a higher resistance to fluid flow, which leads to higher pressure drops for a given flow rate across the filter and increased energy consumption.

There is a need for filter media that can be used in ASHRAE applications that have high efficiency, low fluid flow resistance, and low energy consumption. It is to solving this need the present invention is directed.

SUMMARY

The present disclosure is directed to filter media having an alpha value greater than 13 and methods of manufacturing the filer media. In one embodiment, the non-woven filter media comprises a plurality of large diameter fibers having an average diameter of greater than about 6 microns and comprising greater than about 60% by weight of the fiber web; a plurality of ultrafine diameter fibers having an average diameter of less than about 1 micron; and a binder, wherein the filter media has an alpha value greater than 13 and is free of coarse fibers having a diameter of 1 to 4 microns.

In another embodiment of the present disclosure, the filter media comprises a non-woven fiber web having an alpha value greater than about 13, the fiber web comprising a plurality of large diameter fibers, the fibers having an average diameter of greater than about 6 microns and comprising greater than about 60% by weight of the fiber web; and a plurality of microglass fibers, the fibers having an average diameter of less than about 1.0 micron, wherein the fibers have an aspect ratio greater than 10, and wherein the non-woven filter media has a basis weight of 30 gsm to 100 gsm and is free of coarse fibers having a diameter of 1 to 4 microns.

Yet, in another aspect of the present disclosure, a method of manufacturing a filter media comprises forming a wet laid nonwoven fiber web comprising a plurality of large diameter fibers having an average diameter of greater than about 6 microns and comprising greater than about 60% by weight of the fiber web, and a plurality of ultrafine fibers having an average diameter of less than about 1 micron; introducing a binder into the fiber web; and drying the resulting fiber web, wherein the fiber web is free of coarse fibers having a diameter of 1 to 4 microns.

DETAILED DESCRIPTION

The present disclosure is generally directed to a filter media suitable for use in ASHRAE applications. The filter media includes a nonwoven blend of ultrafine diameter fibers and large diameter fibers. The ultrafine fibers have an average diameter of less than about 1 micron, and the large diameter fibers having an average diameter of greater than about 6 microns. In addition, the large diameter fibers can make up greater than about 60% by weight whereas the ultrafine fibers are generally less than 40% by weight based on the total weight of the fiber web. As described below, the filter media has desirable properties including high efficiency, alpha values, and low pressure drops across the filter. For example, the filter media can be configured to provide an alpha value greater than 13, which is independent of the material selected for the fibers.

As used herein the term "fiber" generally means a material in which the length to diameter ratio, i.e., aspect ratio, is greater than about 10. Fiber is typically classified according to its diameter. Ultrafine diameter fibers generally refer to a fiber having an average diameter of less than about 1 micron; coarse diameter fibers are generally defined as fiber having an average diameter from about 1 micron to about 4 microns; and large diameter fibers generally refer to a fiber having an average diameter of greater than about 6 microns. The filter media in accordance with the present disclosure is substantially free of coarse fibers.

The term "nonwoven" generally means a web or mat having a structure of individual fibers which are randomly interlaid, but not in an identifiable manner as is the case of a knitted or woven fabric. The filter media made in accordance with the present disclosure can be a nonwoven structure. That is, the fiber web can be made using nonwoven processes such as wet laid processes, as described further below. "Fiber web" generally means a nonwoven mat of fibers, combined or adhered together in such a way that the combination provides a porous structure that permits fluid (e.g., gas, liquid) to flow through.

In the present disclosure, the ultrafine diameter fibers of the filter media have an average diameter of less than about 1 micron. For example, the ultrafine diameter fiber can have an average diameter in the range between about 0.3 microns to about 1 micron. In another aspect, the ultrafine fiber diameter is in the range between about 0.5 micron and about 0.7 micron. Yet, in another aspect, the ultrafine diameter fibers have an average diameter about or in the range between about 0.1, 0.2, 0.3, 0.4, 0.5, 0.6, 0.7, 0.8, 0.9, and 1.0 micron.

The large diameter fibers of the filter media can have an average diameter of greater than about 6 microns. For example, the large diameter fibers can have an average diameter in the range between about 6 microns and about 30 microns. In another aspect, the large diameter fibers have an average diameter in the range between about 6 microns and about 12 microns. Yet, in another aspect, the large diameter fibers have an average diameter greater than about 6.5 microns. Still yet, in another aspect, the large diameter fibers have an average diameter about or in the range between about 6.0, 6.5, 7.0, 7.5, 8.0, 8.5, 9.0, 9.5, 10.0, 10.5, 11.0, 11.5, 12.0, 15.0, 20.0, 25.0, and 30.0 microns.

The ratio between the weight percentage of large diameter fibers and ultrafine fibers provides for different characteristics in the filter media. In general, increasing the percentage of ultrafine fibers will increase the overall surface area of the filter media. Accordingly, decreasing the percentage of ultrafine diameter fibers will decrease the overall surface area of the filter media. Thus, in general, increasing the amount of large diameter fibers as compared to the amount of ultrafine diameter fibers decreases the overall surface area of the filter media. Accordingly, increasing the amount of ultrafine diameter fibers as compared to the amount of large diameter fibers increases the surface area of the filter media.

The percentage of large diameter fibers and ultrafine diameter fibers within the filter media are selected to provide desired characteristics. Various percentages of large diameter fibers can be included in the filter media. For example, large diameter fibers can make up greater than about 60% by weight of the fiber web, greater than about 70% by weight of the fiber web in other embodiments, or greater than about 80% by weight of the fiber web in still other embodiments. In one aspect, large diameter fibers can make up between about 60% and about 99% by weight of the fiber web.

The ultrafine diameter fibers can make up less than about 40% by weight of the fiber web, less than about 30% by weight of the fiber web in other embodiments, or less than about 20% by weight of the fiber web in still other embodiments. The weight percentages of the ultrafine and large diameters fibers are based on the total weight of the filter media.

It should be noted that the ultrafine or large diameter fibers are not intended to be limited to any specific material or combination of materials provided the large fibers have a diameter greater than about 6 microns and the ultrafine fibers have a diameter less than about 1 micron. The filter media fibers are produced by generally conventional methods of operation.

By way of example, the large diameter fibers and/or the ultrafine diameter fibers can be comprised of natural fibers. The term "natural fiber" generally refers to any cellulosic fiber, wood fiber, non-wood fibers, pulp-derived fiber or mixtures thereof. The terms "cellulosic", "cellulosic fiber" and the like are meant to include any fiber incorporating cellulose as a major constituent. "Papermaking fibers" means cellulosic fibers and includes virgin pulps or recycled (secondary) cellulosic fibers, or fiber mixtures of reconstituted cellulosic fibers. Suitable nonwood fibers include cotton or cotton derivative fibers, abaca fibers, kenaf fibers, sabai grass fibers, flax fibers, esparto grass fibers, straw fibers, jute hemp fibers, bagasse fibers, milkweed floss fibers, and pineapple leaf fibers. Suitable wood fibers, such as those obtained from deciduous and coniferous trees, include softwood fibers, such as northern and southern softwood Kraft fibers, and hardwood fibers, such as eucalyptus, maple, birch, aspen, or the like. Papermaking fibers used in connection with the invention include naturally occurring pulp-derived fibers, as well as reconstituted cellulosic fibers, such as lyocell or rayon. Pulp-derived fibers are liberated from their source material by any one of a number of pulping processes familiar to one experienced in the art including sulfate, sulfite, polysulfide, soda pulping, etc. The pulp can be bleached if desired by chemical means including the use of chlorine, chlorine dioxide, oxygen, alkaline peroxide and so forth. Naturally occurring pulp-derived fibers are referred to herein simply as "pulp-derived" papermaking fibers. The filter media of the present invention can include a blend of conventional fibers (whether derived from virgin pulp or recycled sources) and high coarseness lignin-rich tubular fibers, such as bleached chemical thermomechanical pulp (BCTMP). Pulp-derived fibers thus also include high yield fibers such as BCTMP, as well as thermomechanical pulp (TMP), chemithermomechanical pulp (CTMP) and alkaline peroxide mechanical pulp (APMP).

In some embodiments, the ultrafine diameter fibers and/or the large diameter fibers of the filter media can include a natural or cellulosic fiber content of at least 5% of the total weight of the fibers. For example, the total natural or cellulosic fiber content can be in the range of about 20% to about 80% by weight of the fiber web. In another aspect, the total natural or cellulosic fiber content can be in the range of about 0% to about 50% by weight of the fiber web. Yet, in another aspect, the natural or cellulosic fiber content can be in the range of about 60% to about 90% by weight of the fiber web. It should be understood that, in some aspects, the filter media does not include any natural or cellulosic fiber.

In other embodiments, the large diameter fibers or the ultrafine diameter fibers can be comprised of synthetic fibers (or combinations of synthetic and natural fibers as may be desired for different applications). "Synthetic fiber" and like terminology refer to fiber made from synthetic polymers such as polyesters, nylons and polyolefins and so forth. In one aspect, synthetic fibers include a thermoplastic. Polyesters are generally obtained by known polymerization techniques from aliphatic or aromatic dicarboxylic acids with saturated aliphatic or aromatic diols. Preferred aromatic di-acid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified and polycondensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of naphthalene diol (1,5-; 2,6-; and 2,7-). Various mixtures of aliphatic and aromatic dicarboxylic acids, and saturated aliphatic and aromatic diols, can also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Examples of polyesters include: polyethylene terephthalate; poly (1,4-butylene) terephthalate; and 1,4-cyclohexylene dimethylene terephthalate/isophthalate copolymer. Other polyesters include linear homopolymer esters derived from aromatic dicarboxylic acids, including: isophthalic acid; bibenzoic acid; naphthalene-dicarboxylic acid; 1,5-; 2,6-; and 2,7-naphthalene-dicarboxylic acids; 4,4,-diphenylene-dicarboxylic acid; bis(p-carboxyphenyl) methane acid; ethylene-bis-p-benzoic acid; 1,4-tetramethylene bis (p-oxybenzoic) acid; ethylene bis(p-oxybenzoic) acid; 1,3-trimethylene bis(p-oxybenzoic) acid; and 1,4-tetramethylene bis(p-oxybenzoic) acid; and diols selected from the group consisting of 2,2-dimethyl-1,3-propane diol; cyclohexane dimethanol; and aliphatic glycols of the general formula $HO(CH_2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH_2CH_2O)_nH$ where n is an integer from 2 to 10,000, and aromatic diols such as hydroquinone; resorcinol; and the isomers of naphthalene diol (1,5-; 2,6-; and 2,7). The polymers can include one or more aliphatic dicarboxylic acids, such as adipic, sebacic, azelaic, dodecanedioic acid, or 1,4-cyclohexanedicarboxylic acid.

Nylon or polyamide fibers can be produced by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine.

Suitable polyolefin fiber material can be made by polymerizing olefins such as ethylene, propylene, 1-butene, 1-pentene, 4-methylpent-1-ene, etc., in a conventional manner. Useful polyolefins for fibers are high-density polyethylene (HDPE) and polypropylene. Other polyolefin homopolymers and copolymers of ethylene can be utilized in the practice of this invention. Such other polyolefins include low-density polyethylene (LDPE), very low-density polyethylene (VLDPE), linear low-density polyethylene (LLDPE) and polybutylene (PB). These polyolefins can be blended with other polyolefins, such as polypropylene or high-density polyethylene (HDPE).

In one embodiment, the ultrafine diameter and large diameter fibers of the filter media can include a synthetic fiber content of at least 5% of the total weight of the fibers. For example, the total synthetic fiber content can be in the range of about 20% to about 80% by weight of the fiber web. In another aspect, the total synthetic fiber content can be in the range of about 0% to about 50% by weight of the fiber web. Yet, in another aspect, the synthetic fiber content can be in the range of about 60% to about 90% by weight of the fiber web. It should be understood that, in some aspects, the filter media does not include any synthetic fiber.

In still other embodiments, the large and ultrafine diameter fibers of the filter media can comprise glass fibers. Glass fibers of various sizes and diameters are known to those skilled in the art. For example, the large diameter fibers of the filter media can include chopped strand glass fibers. In some aspects, the chopped strand glass fibers have a length in the range of between about 0.125 inches to about 1 inch (e.g., about 0.25 inches, or about 0.5 inches) and can have a diameter in the range between about 6 microns and about 30 microns. In another aspect, the chopped strand glass fibers can have a diameter between about 7 microns and about 12 microns. Yet, in another aspect, the chopped strand glass fibers can have an average fiber diameter of about 6.5 microns.

In one aspect of the disclosure, the chopped strand glass fibers can have an organic surface finish. Such a surface finish can, for example, enhance dispersion of the fibers during processing. The surface finish can include starch, polyvinyl alcohol, or other suitable finishes. In some cases, the surface finish can be applied as a coating while the chopped strand glass fibers are extruded during production.

The ultrafine diameter fibers can also be formed of glass, e.g., microglass fibers. Microglass fibers generally have an average diameter that is typically smaller than the diameter of chopped strand glass fibers. In one embodiment, the microglass fiber has an average diameter less than about 1 micron. In another embodiment, the microglass fiber diameter can be in the range between about 0.1 micron and about 1.0 microns. In still another embodiment, the microglass fiber can have a diameter between about 0.3 micron and about 0.8 micron.

The microglass fibers can vary significantly in length as a result of process variations. The aspect ratios (length to diameter ratio) of the microglass fibers can be generally in the range of about 100 to about 10,000. In another aspect, the aspect ratio of the microglass fibers is in the range of about 200 to about 2,500. Yet, in another aspect of the present disclosure, the aspect ratio of the microglass fibers is in the range of about 300 to about 600. Still yet, in another aspect, the average aspect ratio of the microglass fibers is in the range of about 750 to about 5,000. It should be appreciated that the above-noted dimensions are not limiting and that the microglass fibers can have other dimensions.

One skilled in the art can determine whether a glass fiber is chopped strand or microglass by observation (e.g., optical microscopy, electron microscopy). Chopped strand glass may also have chemical differences from microglass fibers. In some cases, though not required, chopped strand glass fibers contain a greater content of calcium or sodium than microglass fibers. For example, chopped strand glass fibers can be close to alkali free with high calcium oxide and alumina content. Microglass fibers can contain 10-15% alkali (e.g., sodium, magnesium oxides) and have relatively lower melting and processing temperatures.

Various technique(s) can be used to manufacture the glass fibers. Such techniques impart the glass fibers with certain characteristics. In general, chopped strand glass fibers are drawn from bushing tips and cut into fibers in a process similar to textile production. Microglass fibers are drawn from bushing tips and further subjected to flame blowing or rotary spinning processes. In some cases, microglass fibers can be made using a re-melting process. Chopped strand glass fibers are produced in a more controlled manner than microglass fibers, and as a result, chopped strand glass fibers will generally have less variation in fiber diameter and length than microglass fibers.

Ultrafine diameter and large diameter fibers of the filter media can include any amount of glass fiber content as may be desired for the intended application. It should be understood that, in some aspects, the filter media does not include any glass fiber.

The filter media can also include a binder. In general, the binder can have any suitable composition. The binder can be in the form of one or more components. For example, the binder can be resin-based. In one aspect, the binder includes a soft binder and a hard binder. Though, it should be understood that not all aspects include all of these components (e.g., hard binder) and that other appropriate additives can be incorporated in the binder. Synthetic fibers can enhance adhesion of fibers during processing. Synthetic fibers can be, for example, binder fibers and/or thermoplastics staple fibers. The filter media made in accordance with the present disclosure can include binder in an amount less than about 10%, or less than about 5% (e.g., between 2% and 5%) of the total weight of the filter media. In some aspects, the binder can be about 4% by weight of the total weight of the filter media.

Soft binders are known to those of skill in the art and generally refer to a binder having a relatively low glass transition temperature. For example, a soft binder can have a glass transition temperature less than about 20° C. In one aspect, a soft binder has a glass transition temperature within a range of between −15° C. to +15° C. Another suitable soft binder is acrylic, though it should be understood that other compositions can be suitable, such as for example, polyester, polyolefin, and polyurethane. When present, the soft binder may be one of the larger components of the binder. For example, the soft binder can comprise greater than about 40%, or greater than about 50%, of the total weight of the binder. In some aspects, the soft binder makes up between about 50% and about 80% by weight, or between about 50% and about 55% by weight of the total binder weight. Yet, in another aspect, the soft binder makes up the entire binder weight. In other aspects, no soft binder is present.

Hard binders are known to those of skill in the art and generally refer to a binder having a relatively high glass transition temperature. When used together in a binder resin, a hard binder will have a greater glass transition temperature than a soft binder. In some aspects, a hard binder will have a glass transition temperature within a range of between 25° C. and 105° C. In one aspect, a hard binder has a glass transition temperature of about 55° C. For example, the hard binder can be a polyvinyl acetate, polyvinyl alcohol, polyacrylic acid, acrylic, styrene, styrene acrylic, and/or combinations thereof. Other compositions can be suitable.

When present, the percentage of hard binder within the web can be lower than the percentage of soft binder within the web. However, in other cases, the percentage of hard binder can be higher than, or approximately equal to, the percentage of soft binder. For example, the hard binder can make up less than about 40%, or less than about 30%, of the total weight of the binder. In another aspect, the hard binder makes up between about 25% and about 35% of the total weight of the binder. Yet, in another aspect, the percentage of hard binder in the binder resin is between about 8% and about 10% by weight of the total binder weight. In some aspects, no hard binder is present.

In addition to the binder, additional components, thermoplastics, and glass components described above, the fiber webs can include a variety of other suitable additives (typically, in small weight percentages) including, but not limited to, surfactants, coupling agents, crosslinking agents, amongst others. For example, fluorocarbons and/or polysiloxanes can be added to provide the media with other beneficial properties (e.g., high alpha properties). Other binder components, additional components, and weight percentages are also possible.

The filter media can be produced using processes based on known techniques. As noted above, the filter media can be produced using nonwoven techniques. In some aspects, the filter media are produced using a wet laid processing technique. In general, any fibers to be incorporated into a fiber web, including large and ultrafine diameter fibers, chopped strand glass fibers, microglass fibers, cellulosic fibers, natural fibers, synthetic fibers, and combinations thereof, can be mixed together to provide a fiber slurry. For example, the slurry may be an aqueous-based slurry. In one aspect, the fibers are stored separately in various holding tanks prior to being mixed together. In another aspect, these fibers are processed through a pulper before being mixed together. Yet in another aspect, combinations of large and ultrafine diameter fibers, chopped strand glass fibers, microglass fibers, cellulosic fibers, natural fibers, and/or synthetic fibers are processed through a pulper and/or a holding tank prior to being mixed together.

It should be appreciated that any suitable method for creating a fiber slurry can be used. In some aspects, additional additives can be added to the slurry to facilitate processing. The temperature can also be adjusted to a suitable range, for example, between 33° F. and 100° F. (e.g., between 50° F. and 85° F.). In one aspect, the temperature of the slurry is maintained. In another aspect, the temperature is not actively adjusted.

In some aspects, the wet laid process uses similar equipment as a conventional papermaking process, which includes a hydropulper, a former or a headbox, a dryer, and an optional converter. For example, the slurry can be prepared in one or more pulpers. After appropriately mixing the slurry in a pulper, the slurry may be pumped into a headbox, where the slurry can be combined with other slurries or additives. The slurry can also be diluted with additional water such that the final concentration of fiber is in a suitable range, such as for example, between about 0.01% to about 0.2% by weight of the fibers.

In some aspects, pH of the fiber slurry can be adjusted as desired. In one aspect, the pH of the glass fiber slurry can range between about 2 and about 4, or between about 2.5 and about 3.5. In another aspect, the pH of the fiber slurry is generally about 2.7 or about 2.8.

Fibers can then be collected on a screen or wire at an appropriate rate. Before the slurry is sent to a headbox, the slurry can be passed through centrifugal cleaners for removing un-fiberized glass or shot. The slurry can be passed through additional equipment, such as refiners or deflakers, to further enhance the dispersion of the fibers.

In one aspect, the process then involves introducing binder into the pre-formed fiber web. In another aspect, the fiber web is passed along an appropriate screen or wire, different components included in the binder (e.g., soft binder, optional hard binder), which may be in the form of separate emulsions, are added to the fiber web using a suitable technique. In another aspect, each component of the binder is mixed as an emulsion prior to being combined with the other components and/or fiber web. Still yet in another aspect, the components included in the binder can be pulled through the fiber web using, for example, gravity and/or vacuum. In one aspect, one or more of the components included in the binder can be diluted with softened water and pumped into the fiber web.

After the binder is incorporated into the glass fiber web, the wet-laid fiber web can be appropriately dried. In some aspects, the wet-laid fiber web can be drained. In another aspect, the wet-laid fiber web can be passed over a series of drum dryers to dry at an appropriate temperature (e.g., about 275° F. to 325° F., or any other temperature suitable for drying). For some aspects, typical drying times can vary until the moisture content of the composite fiber is as desired. In one aspect, drying of the wet-laid fiber web can be performed using infrared heaters. In another aspect, drying will aid in curing the fiber web. In addition, the dried fiber web can be appropriately reeled up for downstream filter media processing.

Different layers of fiber webs can be combined to produce filter media based on desired properties. For example, the ultrafine and large diameter fiber webs can be prepared in parallel, and then combined to form a multi-phase (e.g. dual phase) filter media. Multi-phase fiber media can be formed in an appropriate manner. As an example, a filter media can be prepared by a wet laid process where a first dispersion includes a fiber slurry of large diameter fibers in an aqueous solvent, which is applied onto a wire conveyor in a papermaking machine (e.g., fourdrinier or rotoformer), forming a first phase. A second dispersion includes another slurry of ultrafine diameter fibers, such as microglass fibers in an aqueous solvent, which is then applied onto the first phase, forming a second phase. A third dispersion including a fiber slurry of large diameter fibers in an aqueous solvent is then applied onto the second phase, forming a third phase. Vacuum is continuously applied to the first, second, and third dispersions of fibers during the above process to remove solvent from the fibers, resulting in a filter media having a first phase, a second phase, and a third phase. The first phase and third phase can include the same or different large diameter fiber composition. The filter media formed is then dried. It can be appreciated that filter media can be suitably tailored not only based on the components of each fiber web, but also according to the effect of using multiple fiber webs of varying characteristics in appropriate combination.

After formation, the filter media can be further processed according to a variety of known techniques. For example, the filter media can be pleated and used in a pleated filter element. In one aspect, filter media, or various layers thereof, can be suitably pleated by forming score lines at appropriately spaced distances apart from one another, allowing the filter media to be folded. It should be appreciated that any suitable pleating technique can be used.

The filter media can include other parts, in addition to the fiber web. In some aspects, the filter media can include more than one glass fiber web. In another aspect, further processing includes incorporation of one or more structural features and/or stiffening elements. The glass fiber webs can be combined with additional structural features, such as polymeric and/or metallic meshes. For example, a screen backing can be disposed on the filter media, providing for further stiffness. Yet in another aspect, a screen backing can aid in retaining the pleated configuration. For example, a screen backing can be an expanded metal wire or an extruded plastic mesh.

The filter media can be incorporated into a variety of suitable filter elements for use in various applications including ASHRAE filter media applications. The filter media can be used for any air filtration application. For example, the filter media can be used in heating and air conditioning ducts. The filter media also can be used in combination with other filters as a pre-filter, such as for example, acting as a pre-filter for high efficiency filter applications (e.g., HEPA). Filter elements can have any suitable configuration as known in the art including bag filters and panel filters.

In one aspect, the filter element includes a housing that can be disposed around the filter media. The housing can have various configurations, with the configurations varying based on the intended application. In another aspect, the housing can be formed of a frame that is disposed around the perimeter of the filter media. For example, the frame can be thermally sealed around the perimeter. Yet in another aspect, the frame has a generally rectangular configuration surrounding all four sides of a generally rectangular filter media. The frame can be formed from various materials, including for example, cardboard, metal, polymers, or any combination of suitable materials. The filter elements can also include a variety of other features known in the art, such as stabilizing features for stabilizing the filter media relative to the frame, spacers, or any other appropriate feature.

The filter media can be incorporated into a bag (or pocket) filter element. A bag filter element can be formed by placing two filter media together (or folding a single filter media in half), and mating three sides (or two if folded) to one another such that only one side remains open, thereby forming a pocket inside the filter. In one aspect, multiple filter pockets can be attached to a frame to form a filter element. Each pocket can be positioned such that the open end is located in the frame, thus allowing for air flow into each pocket. In another aspect, a frame can include rectangular rings that extend into and retain each pocket. It should be appreciated that a frame can have virtually any configuration, and various mating techniques known in the art can be used to couple the pockets to the frame. Moreover, the frame can include any number of pockets, such as for example, between 6 and 10 pockets, which are common for bag filters.

A bag filter can include any number of spacers disposed therein and configured to retain opposed sidewalls of the filter at a spaced distance apart from one another. Spacers can be threads or any other element extending between sidewalls. It can be understood that various features known in the art for use with bag or pocket filters can be incorporated into the filter media disclosed herein.

It should be understood that the filter media and filter elements can have a variety of different constructions and the particular construction depends on the application in which the filter media and elements are used. In some aspects, a substrate can be added to the filter media. The filter elements can have the same property values as those noted above in connection with the filter media.

During use, the filter media mechanically trap contaminant particles on the fiber web as fluid (e.g., air) flows through the filter media. The filter media need not be electrically charged to enhance trapping of contamination. Thus, in some aspects, the filter media are not electrically charged. However, in other aspects, the filter media can be electrically charged. Yet in another aspect, the filter media can include water repellant properties.

The filer media of the present disclosure can have many applications, not limited to ASHRAE applications. For example, the filter media can be suitable for liquid-liquid coalescing applications, gas-liquid coalescing applications, hydraulic filtering applications, and the like. It is to be understood that the uses and applications of the disclosed invention are not limited, and any suitable application of the air filter media is possible.

The permeability of the filter media can be measured according to the Technical Association of the Pulp and Paper Industry (TAPPI) Method T251. The permeability of a filter media is an inverse function of flow resistance and can be measured with a Frazier Permeability Tester. The Frazier Permeability Tester measures the volume of air per unit of time that passes through a unit area of sample at a fixed differential pressure across the sample. Permeability can be expressed in cubic feet per minute per square foot at a 0.5 inch water differential. The permeability of the filter media can range from between about 5 cubic feet per minute per square foot (cfm/sf) and about 250 cfm/sf, between about 7 cfm/sf and about 200 cfm/sf, or between about 15 cfm/sf and about 135 cfm/sf.

The basis weight of the filter media can be measured according to TAPPI Standard T410. The values are expressed in grams per square meter or pounds per 3,000 square feet. Generally, basis weight can be measured on a laboratory balance that is accurate to 0.1 grams. A preferred size is 95 square inches of area. In some aspects, the basis weight of the filter media is in the range from between about 30 grams per square meter (gsm) and about 100 gsm, between about 40 gsm and about 90 gsm, or between about 50 gsm and about 80 gsm. In another aspect, the basis weight is about or in the range between about 30, 35, 40, 45, 50, 55, 60, 65, 70, 75, 80, 85, 90, 95, and 100 gsm.

The caliper of the filter media can be measured according to TAPPI Standard T411. Following this technique, a motorized caliper gauge TMI gage 49-70 can be used, which has a pressure foot of 0.63 inch (16.0 mm) diameter and exerts a load of 7.3 psi (50 kPa). In one aspect, for example, the caliper of the filter media measured at 7.3 pounds per square inch (psi) ranges from between about 0.10 mm and about 50.0 mm, between about 0.10 mm and about 10.0 mm, between about 0.20 mm and about 0.90 mm, or between about 0.25 mm and about 0.50 mm.

The filter media may be further characterized by other properties. Penetration, often expressed as a percentage, is defined as follows:

$$\text{Penetration}(\%) = C/C_0$$

where $C$ is the particle concentration after passage through the filter and $C_0$ is the particle concentration before passage through the filter. Penetration can be measured according to the U.S. Military Standard MIL-STD-282 (1956). Typical tests of penetration involve blowing dioctyl phthalate (DOP), or dioctyl sebacate (DEHS), an accepted equivalent to DOP, particles through a filter media and measuring the percentage of particles that penetrate through the filter media. The DOP or DEHS aerosol particles are approximately 0.3 microns in diameter and blown at a face velocity of approximately 5.3 cm/sec through the filter media. Filter efficiency, accordingly, is defined as:

Filter efficiency=100−% Penetration

Filter media can be rated according a value termed "alpha value," also called gamma value. Steeper slopes, or higher alpha values, are indicative of better filter performance. Alpha value is expressed according to the following formula:

alpha=(−log(DEHS penetration %/100)/pressure drop, mm $H_2O$)×100

The pressure drop, also referred to as flow resistance, across the filter media is measured based on the above DEHS penetration test. The pressure drop is measured as the differential pressure across the filter media during air flow through at a velocity of 5.3 centimeters per second (corrected for standard conditions of temperature and pressure). Values are typically recorded as millimeters of water ($H_2O$) or Pascals. The pressure drop across the filter media is generally less than 25.0 mm of $H_2O$. In some aspects, the pressure drop of the filter media can range from between about 0.5 mm $H_2O$ and about 20.0 mm $H_2O$, or between about 1.0 mm $H_2O$ and about 10.0 mm $H_2O$.

As discussed above, the DEHS penetration percentage is based on the percentage of particles that penetrate through the filter media. With decreased DEHS penetration percentage (i.e., increased efficiency) where particles are less able to penetrate through the filter media, alpha value increases. With decreased pressure drop (i.e., low resistance to fluid flow across the filter), alpha value increases (this assumes the other property remains constant).

The filter media has high alpha values for ASHRAE applications, particularly when considered in combination with the above-noted Frazier permeabilities. For example, the alpha values for the filter media can be greater than about 13, greater than about 15, or greater than 18.

With respect to the above description, it is to be realized that the optimum composition for the parts of the invention, to include variations in components, materials, shape, form, function, and manner of operation, assembly and use, are deemed readily apparent and obvious to one skilled in the art, and all equivalent relationships to those illustrated in the example and described in the specification are intended to be encompassed by the present disclosure.

Therefore, the foregoing is considered as illustrative only of the principles of the invention. Further, various modifications may be made of the invention without departing from the scope thereof, and it is desired, therefore, that only such limitations shall be placed thereon as are imposed by the prior art and which are set forth in the appended claims.

What is claimed is:

1. A non-woven filter media comprising:
a single layer consisting essentially of a blend of:
a plurality of large diameter fibers having an average diameter of greater than about 6 microns and comprising greater than about 60% by weight of the fiber web;
a plurality of ultrafine diameter fibers having an average diameter of less than about 1 micron; and
a binder, wherein the filter media has an alpha value greater than 13 and is free of coarse fibers having a diameter of 1 to 4 microns.

2. The filter media according to claim 1, wherein the basis weight is in the range between about 30 gsm and about 100 gsm.

3. The filter media according to claim 1, wherein the alpha value is greater than about 15.

4. The filter media according to claim 1, wherein the alpha value is in the range between about 14 and 22.

5. The filter media according to claim 1, wherein the ultrafine diameter fibers comprise microglass fibers and the large diameter fibers comprise chopped glass fibers.

6. The filter media according to claim 1, wherein the binder is in an amount less than about 10% based on a total weight of the filter media.

7. The filter media according to claim 1, wherein the large diameter fibers comprise greater than about 70% by weight of the fiber web.

8. The filter media according to claim 1, wherein the ultrafine fibers have an average diameter between about 0.3 micron and about 0.7 micron.

9. The filter media according to claim 1, wherein the large diameter fibers have an average diameter greater than about 8 microns.

10. The filter media according to claim 1, wherein the large diameter fibers and/or the ultrafine diameter fibers are comprised of natural fibers, synthetic fibers, glass fibers, and combinations thereof.

11. The filter media according to claim 1, wherein the large diameter fibers comprise polyester fibers, nylon fibers, or polyolefin fibers.

12. A filter media comprising:
a non-woven fiber web having an alpha value greater than about 13, the fiber web comprising a single layer consisting essentially of a blend of:
a plurality of large diameter fibers, the fibers having an average diameter of greater than about 6 microns and comprising greater than about 60% by weight of the fiber web; and
a plurality of micro glass fibers, the fibers having an average diameter of less than about 1.0 micron, wherein the fibers have an aspect ratio greater than 10, and wherein the non-woven filter media has a basis weight of 30 gsm to 100 gsm and is free of coarse fibers having a diameter of 1 to 4 microns.

13. The filter media according to claim 12, wherein the large diameter fibers and/or the ultrafine diameter fibers are comprised of natural fibers, synthetic fibers, glass fibers, and combinations thereof.

14. The filter media according to claim 12, wherein the large diameter fibers comprise greater than about 70% by weight of the fiber web.

15. The filter media according to claim 12, wherein the large diameter fibers have an average diameter greater than about 8 microns.

16. The filter media according to claim 12, wherein the large diameter fibers comprise cellulosic fibers.

17. The filter media according to claim 12, wherein the large diameter fibers comprise polyester fibers, nylon fibers, or polyolefins fibers.

18. A method of manufacturing a filter media, the method comprising:
forming a wetlaid nonwoven fiber web comprising a single layer consisting essentially of a blend of a plurality of large diameter fibers having an average diameter of greater than about 6 microns and comprising greater than about 60% by weight of the fiber web, and a plurality of ultrafine fibers having an average diameter of less than about 1 micron;

introducing a binder into the fiber web; and drying the resulting fiber web, wherein the single layer of the fiber web is free of coarse fibers having a diameter of 1 to 4 microns.

19. The method of manufacturing the filter media of claim 18, wherein forming the wetlaid nonwoven fiber web comprises depositing a first dispersion of the large fibers onto a wire conveyor to form a web of the large fibers; depositing a second dispersion of the ultrafine fibers onto the web of large fibers; and depositing the first dispersion onto web of the ultrafine fibers.

* * * * *